May 28, 1946.  O. J. POUPITCH  2,401,184

FASTENING DEVICE

Filed Nov. 15, 1943  2 Sheets-Sheet 1

INVENTOR.
Ougljesa Jules Poupitch
By: Loftus, Moore, Olson & Trexler
attys.

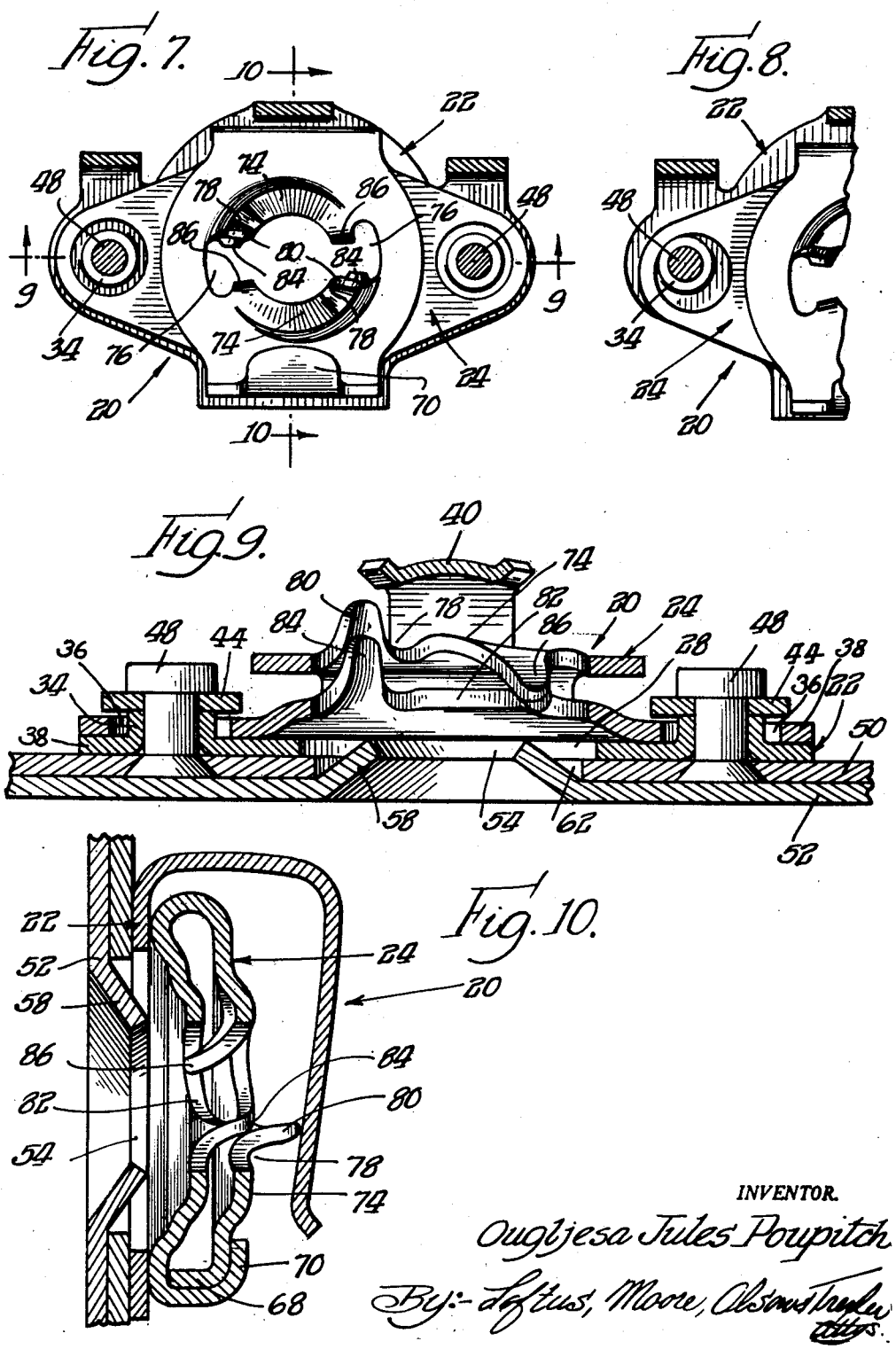

UNITED STATES PATENT OFFICE 2,401,184

FASTENING DEVICE

Ougljesa Jules Poupitch, Chicago, Ill., assignor to Illinois Tool Works, Chicago, Ill., a corporation of Illinois Application November 15, 1943, Serial No. 510,288

11 Claims. (Cl. 24—221)

This invention relates generally to fastener devices wherein a fastening stud member may be quickly attached and detached with respect to a complementary stud engaging or locking part by subjecting the stud to partial rotation.

More specifically the invention contemplates a fastener device of the general type referred to above wherein the part which interlocks with the stud member is shiftably mounted to facilitate initial registration therewith of the stud member.

One form of fastener to which the present invention has a very practical application is well known to the public as cowl fasteners. Cowl fasteners have been used extensively in instances where sheet metal parts must be attached and detached with respect to each other. One of the fields in which cowl fasteners have been extensively employed is in the field of aircraft manufacture, for securing cowling parts in position. It is not infrequent to employ a plurality of cowl fasteners to secure a single cowling part in place. These cowl fasteners are usually distributed along the inside of the sheet to which the cowling part is to be detachably secured in place. The detachable cowling part carries the fastening studs and if each female cowl fastener part is not in absolute registration with its companion stud member on the cowling member or part, difficulty is experienced in effecting a quick attachment. The present invention contemplates a very simple fastener arrangement wherein the part which interlocks with the stud member is capable of being shifted in various directions within certain limits to facilitate initial registration of the aperture therein with its complementary stud member.

More specifically, the present invention contemplates a fastening device for accommodating a locking stud, which lends itself for sheet metal construction and to this end an apertured stud receiving section is shiftably secured in a novel and extremely practical manner upon a supporting base section, which base section is adapted to be secured to a part to be fastened.

It is a further object of the present invention to provide a female stud receiving and locking section of improved, practical, and extremely simple construction.

Other objects and advantages will be made clear by the following detailed description when considered in connection with the accompanying drawings, wherein:

Figure 7 is a plan view similar to Figure 2, with the fastening stud detached and the arms at opposite extremities thereof broken away to more clearly illustrate the clearance provided in the vicinity of the posts extending outwardly from the retainer base;

Figure 8 is a fragmentary plan view of the left portion of the structure shown in Figure 7, with the stud engaging means or plate occupying a shifted position along the retainer base;

Figure 9 is an enlarged sectional view taken along the line 9—9 of Figure 7 to more clearly illustrate certain details of the cam structure of the locking plate and the structure of the base plate positioned immediately therebeneath; and Figure 10 is an enlarged transverse sectional view taken substantially along the line 10—10 of Figure 7.

Figure 5:
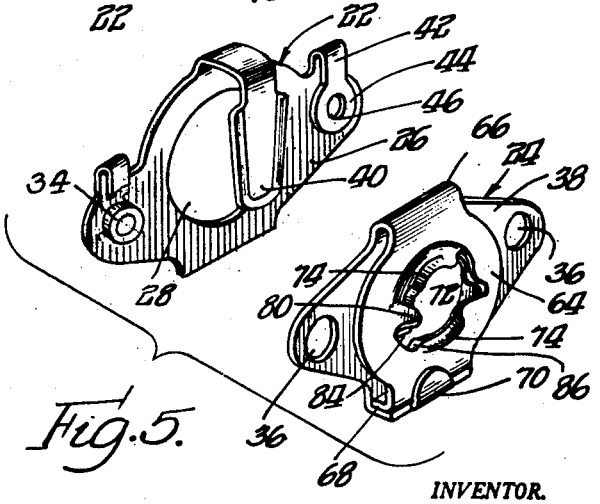
Figure 5 is a perspective exploded view to more clearly illustrate the structural features of the two constituent parts of the sheet metal fastener, namely the retainer base and the stud engaging section.

Referring now to the drawings, wherein like numerals have been employed to designate similar parts throughout the various figures, it will be seen that one embodiment of the present invention comprises a sheet metal fastener structure designated generally by the numeral 20. This sheet metal structure comprises two main parts (see Figure 5) one designated generally by the numeral 22 and hereafter referred to as a retainer base section, and the other designated generally by the numeral 24, hereafter referred to as the stud engaging means, section, member or plate. The retainer base means 22 includes a plate or base proper 26 having a central aperture 28 for accommodating a rotary fastening stud designated generally by the numeral 30. It will be noted that the aperture 28 is of sufficient diameter to permit the passage therethrough of the stud cross pin 32.

Spaced from the aperture 28 and on opposite sides thereof the stock of the plate 26 is laterally extruded to provide annular retainer post means or structures 34, as clearly illustrated in Figures 4, 7, 8 and 9. These post structures 34 extend laterally outward from the base plate 26 and are designed for telescopic association with complementary apertures 36 provided in the plate 38 of the stud engaging member 24. The apertures 36 are sufficiently large so as to provide considerable clearance around the post 34, as clearly illustrated in Figures 7 and 8. It will also be noted that a stud ejector spring 40 integral with the stock of the retainer base 22 is adapted to be engaged by the extremity of the stud when the parts are in assembled relation.

Figure 4:
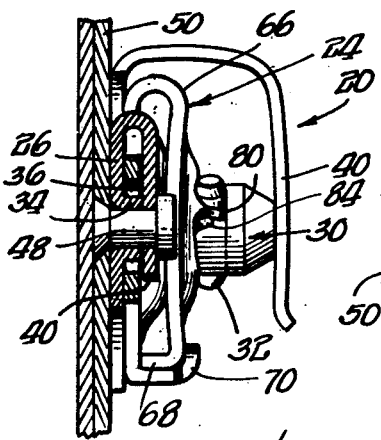
Figure 4 is a transverse sectional view taken substantially along the line 4—4 of Figure 2, the stud ejector being shown by solid lines.
Figure 3:
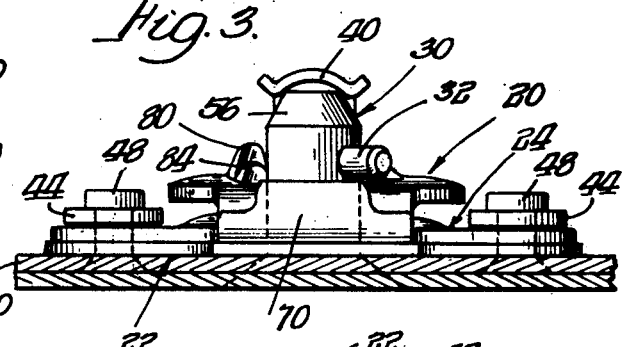
Figure 3 is a side elevational view taken along the line 3—3 of Figure 2, the stud ejector being shown by solid lines.

The stud engaging or locking member 24 is adapted to be mounted upon the outer surface of the retainer base 22 with the posts 34 and apertures 36 telescopically associated, as clearly illustrated in Figures 4 and 9. To secure the stud engaging member 24 against axial displacement from the post 34, the retainer base is provided with arms 42 forming means for resisting separation of the sections 22 and 24 axially with respect to the post means or structures 34. Each arm 42 is formed as an integral extension of the base structure. The free extremities of these arms 42 are enlarged to provide a washer-like structure 44 and are apertured at 46 to accommodate a fastening rivet 48. The axial length of the posts 34 is slightly greater than the thickness of the plate stock 38, so that when the rivet 48 is secured in position as shown, the washer-like structure 44 will bear against the outer extremities of the post 34 without causing any frictional engagement with the plate 38. In other words, once the rivets 48 have been tightened in place, the plate 38 is completely shiftable along the surface of the retainer base plate 26 within the limits provided by the clearance between the apertures 36 and the posts 34. The rivets 48 also serve to secure the parts 22 and 24 to the surface of a work sheet 50.

In this connection it will be noted that the work sheet 52, which is to be secured to the work sheet 50 by means of the fastener device just described, is provided with an aperture 54 to accommodate the shank 56 of the stud 30 and is dimpled at 58 to accommodate the head 60 of the stud. In practice when a stud of the type disclosed herein is employed, the shank 56 thereof is first inserted through the aperture 54 of the work piece 52 and the cross pin 32 subsequently inserted within the shank of the stud. With the stud thus retained by the work piece 52 it is in readiness for telescopic association with an aperture 62 in the work piece 50 (see Figure 9) and the aperture 28 of the retainer base member 22.

Figure 2:
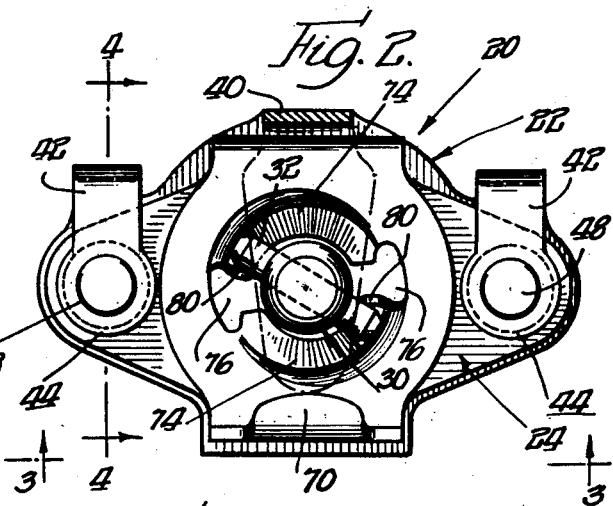
Figure 2 is an enlarged elevational view of the fastener device as viewed from the rear of Figure 1, the stud ejector spring being broken away to disclose parts otherwise hidden.

In the disclosed embodiment, the stud engaging or locking member 24 includes a resilient locking plate structure 64 disposed in superimposing relation with respect to the plate 38. The locking spring structure or plate 64 is formed integral with the plate 38 and is maintained in spaced relation with respect to the plate 38 by a spacing section or connection 66 on one side and a spacing member or flange 68 on the other side. The stock of the plate 38 in the vicinity of the flange 68 is provided with an extension 70 which overlaps the flange 68 and the upper surface of the spring plate 64 sufficiently to prevent outward displacement of the free extremity or margin of the spring locking plate 64. The spring locking plate or section 64 is provided with a central aperture 72 for accommodating the stud shank and is also formed along the margins of said aperture with a pair of cam surfaces 74 positioned for coaction with the cross pin 32. Opening radially outward from opposite sides of the central aperture 72 are recessed areas 76 for accommodating the extremities of the cross pin to enable the cross pin to be brought into and out of association with the cam surfaces. After the cross pin has been inserted and rotated in a counterclockwise direction, as viewed in Figure 2, said cross pin passes from the low to the high point of the cam surface and ultimately seats itself within a depression 78 and is prevented from continued rotation by an outwardly projecting stop member 80.

Positioned immediately beneath the cam portion of the locking plate 74 is an abutment 82 which serves to limit the extent to which the plate 64 may be stressed. In order to positively prevent the cross pin from passing between the underside of the cam and the outer side of the abutment 82, an abutment 84, corresponding in shape with the abutment or stop 80, extends outwardly from the abutment 82 and thus prevents the cross pin from entering between the cam plate and abutment at that extremity. At the outer extremity a stop or abutment 86 is provided which prevents the cross pin from entering into the space between the cam and the abutment 82 from that extremity.

Figure 6:
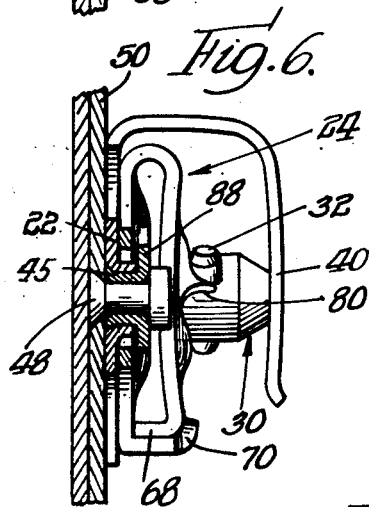
Figure 6 is a view similar to Figure 4, disclosing a slightly modified form of means for resisting axial separation of the retainer base and the stud engaging section.

It will also be apparent from the foregoing disclosure that when the stud is telescopically associated with the fastener members 22 and 24 the advancing extremity thereof is brought into engagement with the ejector spring 40. This spring 40 serves to eject the stud when the cross pin is rotated from the position shown in Figure 2 to the point where the cross pin registers with the radial openings 76. Also, the spring 40, in constantly urging the stud outwardly from the stud engaging section, as indicated in Figures 4 and 6, increases the force required to rotatably disengage the cross pin from its companion depression 78. In other words, the spring 40 serves as a rotation resisting, as well as stud ejecting, means.

In Figure 6 a slightly modified construction is disclosed. The only structural difference between the fastening device shown in Figure 6 and the fastening device or structure previously described resides in the provision of an eyelet 88 in place of the superimposing arms 42 and the washer-like portions 44. The outer flange of the eyelet 88 functions similarly to the washer-like sections 44 of the arms 42, and the inner extremity 45 of the eyelet is peened outwardly into locking association with the plate 22, as clearly shown in the drawings. In all other respects the disclosure in Figure 6 corresponds with the structural features previously described.

It will be apparent from the foregoing description that the present invention contemplates a fastener arrangement wherein a retainer base section is adapted to be secured to one of the work pieces or plates to be fastened and the stud engaging or locking section is adapted to be loosely secured in position upon said retainer base. The clearance provided around the posts 34 is sufficient to enable the required adjustment of the central aperture in the locking plate to accommodate an eccentrically positioned stud member. It will be noted that the end of the stud member is tapered so as to facilitate its entrance within the complementary apertures in the sheet metal parts, and this taper, together with the limited shifting of the locking plate in various directions, materially contributes to the ease with which fasteners of the type described herein may be interlocked with a complementary stud member. As previously pointed out, it is common practice to employ a plurality of fastening units made up of the retainer base 22 and the locking section 24 in spaced relation adjacent the margin of an opening in a sheet metal part. These may correctly be referred to as a plurality of female fastening structures secured to the underside of a sheet or plate. This arrangement is commonly employed in aircraft construction, and the part used to cover the opening is provided with a similar number of studs. When the sheet metal part carrying the studs is brought into covering relation with the aforesaid opening on the other sheet metal part, all of the studs must register with a companion sheet metal fastener. It is to facilitate the initial registration of the studs with these fasteners that the shiftable or floating arrangement of the stud locking part 24 is employed. In this connection it is to be noted that by having the post means or members 34 spaced a considerable distance from each other the spring locking part never experiences any appreciable rotation. Thus even though the spring locking part experiences its maximum degree of shift, the degree of rotation thereof is relatively slight. When a plurality of studs are being used on a single part and the stud members are brought into registration with the central aperture of the locking spring, the cross pin of the stud should occupy the same angular disposition with respect to the fastener in order to register with the radial slots or openings 76, regardless of the position to which the spring locking section may have been eccentrically shifted to accommodate the stud. This would not be true, however, if the slots or openings 76 experienced rotary movement to any degree whenever the spring locking section is shifted.

Figure 1:
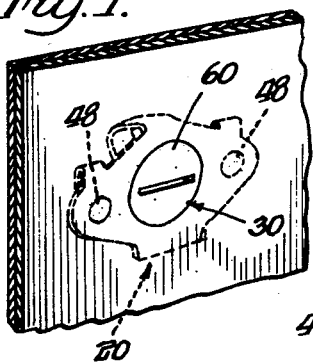
Figure 1 is a fragmentary perspective view of a pair of metallic sheets secured together by a fastener device of the type contemplated by the present invention.

The predetermined angular positioning of the cross pin is important because in many installations the extremity of the stud which carries the cross pin is completely hidden from view when the work sheet or piece is to be attached. Furthermore, the fastener unit made up of the retainer base and spring locking section is also hidden from view beneath the surface of the other work piece. It is common practice in the use of fastening devices of the type described herein to have the screw driver accommodating slot in the stud head and the cross pin of the stud maintaining a predetermined angular relation with each other about the axis of the stud. This is clearly indicated by comparison of Figures 1 and 2. By having this arrangement the head slots of the stud all occupy the same position when the work piece is fastened to its companion work piece. It is common practice in structures such as aircraft where a series of fasteners are employed at spaced intervals along a given line to so position the fasteners that when the studs are tightened into final position all of the head slots will be positioned in alignment. With this arrangement an unsecured stud may be immediately identified by the misalignment or angular displacement of its head slot with respect to the head slots of the remaining stud members.

The present invention provides a very simple and inexpensive self-aligning stud receiving part, and greatly facilitates the ease with which fasteners of this type may be employed. The advantages of the other structural details herein described will also be apparent. It should be understood that the invention is not limited to the specific structural details disclosed and described herein but is capable of other modifications and changes without departing from the spirit and scope of the appended claims.

The invention is hereby claimed as follows:

1. A fastening device for accommodating a fastening stud member including a retainer base section apertured to telescopically receive a stud member and adapted to be secured to a part to be fastened, a stud engaging section bodily shiftable along said retainer base section and apertured to telescopically accommodate a stud member received by said retainer base section, and retainer post means carried by one of said sections and extending transversely of said sections, sufficient clearance being provided in the other of said sections in the vicinity of said post means to enable the required degree of bodily shifting of said stud engaging section along said retainer base section whereby the aperture of said stud engaging section may be shifted into a position of registration with said stud member.

2. A fastening device for accommodating a fastening stud member including a retainer base section apertured to telescopically receive a stud member and adapted to be secured to a part to be fastened, a stud engaging section bodily shiftable along said retainer base section and apertured to telescopically accommodate a stud member received by said retainer base section, retainer post means carried by one of said sections and extending transversely of said sections, sufficient clearance being provided in the other of said sections in the vicinity of said post means to enable the required degree of bodily shifting of said stud engaging section along said retainer base section whereby the aperture of said stud engaging section may be shifted into a position of registration with said stud member, and means for resisting separation of said sections axially with respect to said post means.

3. A fastening device for accommodating a fastening stud member including a retainer base section apertured to telescopically receive a stud member and adapted to be secured to a part to be fastened, a stud engaging section bodily shiftable along said retainer base section and apertured to telescopically accommodate a stud member received by said retainer base section, and retainer post means including a pair of separated post structures carried by one of said sections and extending transversely of said sections and received by the other of said sections, sufficient clearance being provided in said other section in the vicinity of said post structures to enable the required degree of bodily shifting of said stud engaging section along said retainer base section whereby the aperture of said stud engaging section may be shifted into a position of registration with said stud member.

4. A fastening device for accommodating a fastening stud member including a retainer base section apertured to telescopically receive a stud member and adapted to be secured to a part to be fastened, a stud engaging section bodily shiftable along said retainer base section and apertured to telescopically accommodate a stud member received by said retainer base section, and retainer post means formed integral with and extending transversely from one of said sections and received by the other section, sufficient clearance being provided in said other section in the vicinity of said post means to enable the required degree of bodily shifting of said stud engaging section along said retainer base section whereby the aperture of said stud engaging section may be shifted into a position of registration with said stud member.

5. A fastening device for accommodating a fastening stud member including a retainer base section apertured to telescopically receive a stud member and adapted to be secured to a part to be fastened, a stud engaging section bodily shiftable along said retainer base section and apertured to telescopically accommodate a stud member received by said retainer base section, and retainer post means extending outwardly from said retainer base section and received by the stud engaging section, sufficient clearance being provided in said stud engaging section in the vicinity of said post means to enable the required degree of bodily shifting of said stud engaging section along said retainer base section whereby the aperture of said stud engaging section may be shifted into a position of registration with said stud member.

6. A fastening device for accommodating a fastening stud member including a retainer base section apertured to telescopically receive a stud member and adapted to be secured to a part to be fastened, a stud engaging section bodily shiftable along said retainer base section and apertured to telescopically accommodate a stud member received by said retainer base section, retainer post means carried by one of said sections and extending transversely of said sections and received by the other section, sufficient clearance being provided in said other section in the vicinity of said post means to enable the required degree of bodily shifting of said stud engaging section along said retainer base section whereby the aperture of said stud engaging section may be shifted into a position of registration with said stud member, and means forming an extension of said retainer base section for resisting separation of said sections axially with respect to said post means.

7. A fastening device for accommodating a fastening stud member including a retainer base section apertured to telescopically receive a stud member and adapted to be secured to a part to be fastened, a stud engaging section bodily shiftable along said retainer base section and apertured to telescopically accommodate a stud member received by said retainer base section, retainer post means carried by one of said sections and extending transversely of said sections and received by the other section, sufficient clearance being provided in said other section in the vicinity of said post means to enable the required degree of bodily shifting of said stud engaging section along said retainer base section whereby the aperture of said stud engaging section may be shifted into a position of registration with said stud member, an eyelet means carried by one of said sections and cooperating with said post means and the other section for resisting separation of said sections axially with respect to said post means.

8. A fastening device for accommodating a fastening stud member including a retainer base section apertured to telescopically receive a stud member and adapted to be secured to a part to be fastened, a stud engaging section bodily shiftable along said retainer base section and apertured to telescopically accommodate a stud member received by said retainer base section, retainer post means carried by one of said sections and extending transversely of said sections, sufficient clearance being provided in the other of said sections in the vicinity of said post means to enable the required degree of bodily shifting of said stud engaging section along said retainer base section whereby the aperture of said stud engaging section may be shifted into a position of registration with said stud member, and means carried by one of said sections and adapted to abut and superimpose the outer area of said retainer post means and extending radially beyond the periphery of said post means a sufficient distance to prevent separation of said base and stud engaging sections axially with respect to said post means.

9. A fastening device for accommodating a fastening stud member including a retainer base section apertured to telescopically receive a stud member and adapted to be secured to a part to be fastened, stud engaging means associated with said retainer base and apertured to telescopically accommodate a stud member received by the aperture in said retainer base, said stud engaging means being shiftable in various directions along said retainer base to facilitate initial registration of said stud engaging member with the aperture in said stud engaging means, means for limiting the extent of shifting of said stud engaging means along said retainer base including a retainer post extending outwardly from said retainer base and through said stud engaging section, sufficient clearance being provided around said post to enable the required degree of shifting of said stud engaging means along said base, and means carried by one of said sections for resisting axial separation of said posts and stud engaging means.

10. A fastening device for accommodating a fastening stud member including a retainer base section apertured to telescopically receive a stud member and adapted to be secured to a part to be fastened, a stud engaging section bodily shiftable along said retainer base section and apertured to telescopically accommodate a stud member received by said retainer base section, and retainer post means carried by one of said sections and including post structures positioned on opposite sides of the stud receiving apertures of said base and stud engaging sections and extending transversely of said sections, sufficient clearance being provided in the other of said sections in the vicinity of each of said post elements to enable the required degree of bodily shifting of said stud engaging section along said retainer base section whereby the aperture of said stud engaging section may be shifted into a position of registration with said stud member.

11. A sheet metal fastening device for accommodating a fastening stud member including a retainer base section apertured to telescopically receive a stud member and adapted to be secured to a part to be fastened, stud engaging means slidably associated with said retainer base and apertured to telescopically accommodate a stud member received by the aperture in said retainer base, and means for limiting the extent of shifting of the stud engaging means along said retainer base including posts extending outwardly from said retainer base through said stud engaging means on opposite sides of the aperture in said base, sufficient clearance being provided in said stud engaging means in the vicinity of said posts to permit limited shifting of said stud engaging means along said retainer base in various directions, the aforesaid limited shifting of the parts serving to facilitate initial registration of said fastening stud member with the aperture in said stud engaging means.

OUGLJESA JULES POUPITCH.

Disclaimer

2,401,184.—*Ougljesa Jules Poupitch*, Chicago, Ill. FASTENING DEVICE. Patent dated May 28, 1946. Disclaimer filed Feb. 28, 1948, by the assignee, *Illinois Tool Works*.

Hereby disclaims any fastening device specified in claims 1 to 4, 6 and 7, except wherein the retainer post means includes post structures securing the retainer base section to the part to be fastened.

[*Official Gazette March 30, 1948.*]